United States Patent [19]

Underwood

[11] 4,200,145

[45] Apr. 29, 1980

[54] METHOD OF PREHEATING A LIQUID REACTION MASS OF POLYOLEFIN DISSOLVED IN LIQUID MONOMER

[75] Inventor: Max E. Underwood, Bedford, Mass.

[73] Assignee: The Badger Company, Inc., Cambridge, Mass.

[21] Appl. No.: 868,991

[22] Filed: Jan. 12, 1978

[51] Int. Cl.² ............................................... B01J 1/00
[52] U.S. Cl. ..................................... 526/64; 165/143; 165/163; 422/208
[58] Field of Search .................. 165/1, 143, 144, 145, 165/163; 23/283, 284, 285, 288 E, 288 K

[56] References Cited

U.S. PATENT DOCUMENTS

| | | | |
|---|---|---|---|
| 2,612,350 | 9/1952 | Stadler | 165/143 |
| 4,089,365 | 5/1978 | Miserlis et al. | 165/1 |

*Primary Examiner*—Albert W. Davis
*Assistant Examiner*—Margaret A. Focarino
*Attorney, Agent, or Firm*—Sewall P. Bronstein

[57] ABSTRACT

In the preheating of a liquid reaction mass of polyolefin dissolved in liquid olefin monomer by passing it through a multiple pass preheater, the improvement of using generally U-shaped heat exchanger tubes in a generally U-shaped shell.

3 Claims, 5 Drawing Figures

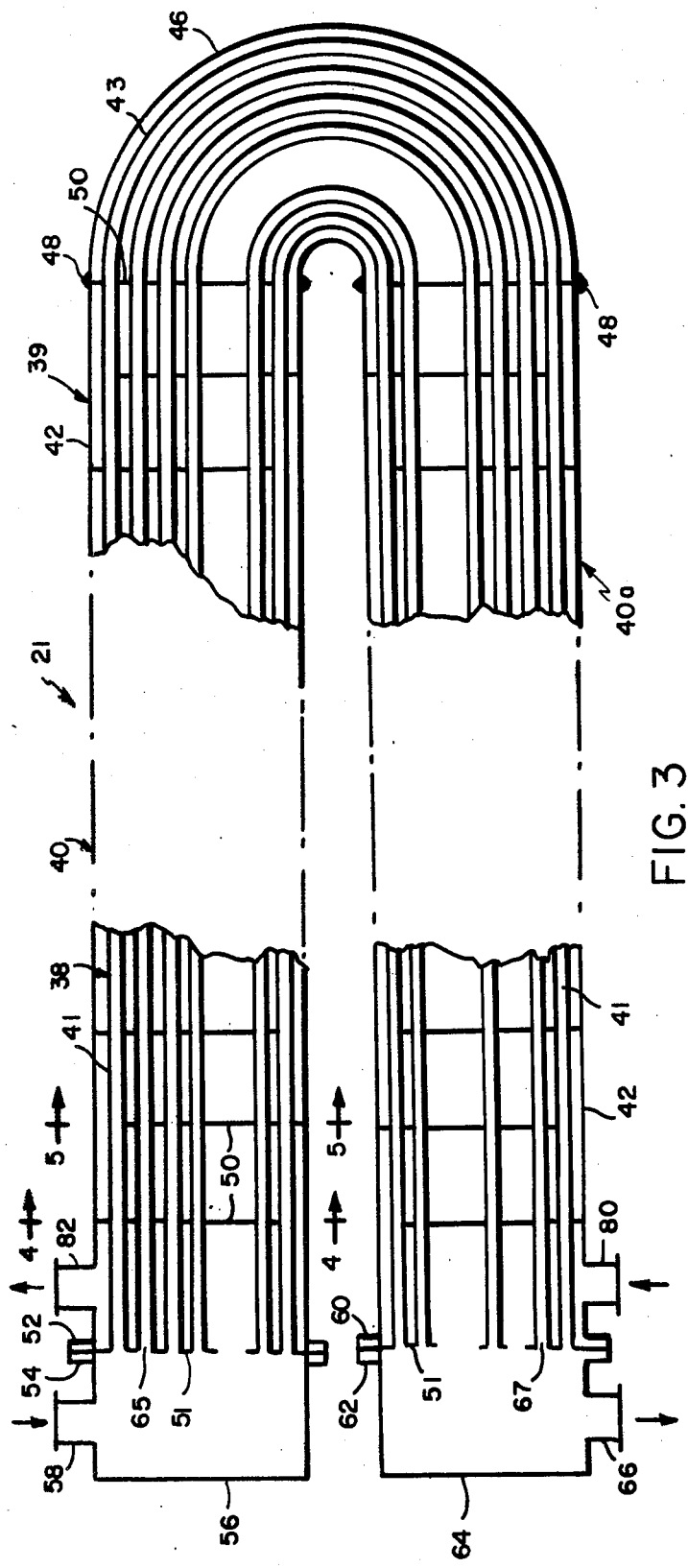
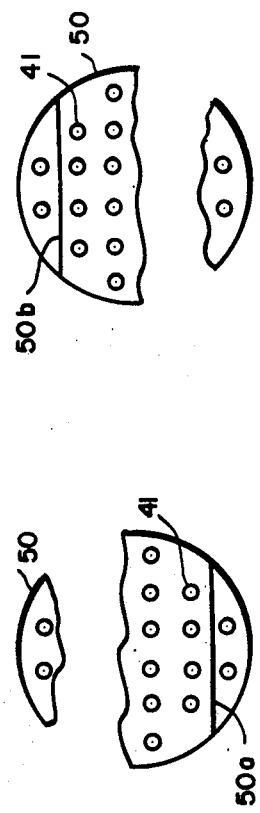
FIG. 3
FIG. 4
FIG. 5

METHOD OF PREHEATING A LIQUID REACTION MASS OF POLYOLEFIN DISSOLVED IN LIQUID MONOMER

THE PROBLEM

In the catalytic liquid phase polymerization under positive pressure of olefins to polyolefins, such as polyethylene, polypropylene, polybutylene, etc., the reaction mass comprises polyolefin dissolved in liquid olefin monomer. The monomer is recovered from the dissolved polymer by preheating the liquid reaction mass under pressure in a single or multiple tube pass preheater to a temperature at which it is flashed off from the polymer (vaporizing point) and is recycled back to the reactor together with fresh liquid olefin monomer feed, after being compressed to a liquid.

Conventional single and multiple tube pass heat exchangers with a single shell have been used to preheat the reaction mass to the vaporizing point of the liquid monomer. Such exchangers comprise a bundle or cluster of straight parallel heat transfer tubes mounted in a shell and individually fixed by means of rolling or welding to a pair of tubes sheets or plates at opposite ends of the shell with a head or chamber at each end of the shell suitably baffled or partitioned to direct the flow in single or multiple tube pass flow through the tube bundle.

The large temperature and pressure gradients which are inherent to the preheating of the reaction mass are most easily accommodated in a single pass, single shell exchanger, which has been used in the past in the aforesaid process, but tube size and space limitations often dictate the use of a multiple tube pass exchanger. For example, a 100 foot long single shell, single tube pass exchanger can be redesigned as a single shell two tube pass 50 foot unit or a single shell ten tube pass 10 foot unit but the design of the heads or chambers and the baffle or partition plates which direct the flow to the various tube passes becomes complicated and serious problems have been encountered with such an arrangement, one of which is partition plate distortion and flange leakage due to the large pressure and temperature gradients across the partitions and another of which will be discussed hereinafter.

An alternative to a single shell multiple tube pass exchanger is a multiple shell bank of single tube pass exchangers, i.e., a plurality of shells in series, each shell having a single pass of tubes with a head at either end thereof, which may also be designed to accommodate the same space requirements as the single shell multiple tube pass exchanger; i.e., one 100 foot single shell unit, two 50 foot single shell units or ten 10 foot single shell units; such an arrangement accommodates the large temperature and pressure gradients since each separate unit is a single tube pass exchanger with no baffle or partition plates in the heads. However, other serious problems have been encountered with this arrangement as will be discussed hereinafter.

Preheating the highly viscous (1000–2000 centipoises) reaction mass of polyolefin dissolved in liquid monomer to raise the monomer to its vaporizing point has presented the following serious problems (referred to above) with the single shell, multiple tube pass type of exchanger and the multiple shell, single tube pass bank of exchangers.

The reaction mass is pumped to the preheater at a pressure above its critical point but as the mass flows through the exchanger its temperature increases and its pressure decreases so that it passes through its critical point (critical pressure and temperature) of the monomer, e.g., 205° F. and 615 psig for propylene. Just prior to reaching this critical point the liquid monomer and the monomer vapor have the same transport properties including the same specific volume and the reaction mass flows as a homogeneous mixture. However, after passing through the critical point during preheating, monomer vapor separates from the liquid solution of polymer in liquid monomer thereby increasing the concentration of the polymer in the liquid monomer. This two-phase mixture flows more or less uniformly through the tubes until it reaches the end of a tube pass and enters the head. The lower velocity and the change of flow direction which occur in the head cause the vapor and liquid to separate and the vapor tends to flow into some of the tubes of the next pass or exchanger and the more concentrated liquid solution tends to flow through other of the tubes. The increase in concentration of the polymer in the liquid solution phase drastically increases the viscosity of such phase over 1000 fold to thereby decrease the velocity of liquid flow and force the vapor to flow at a very high velocity in a very small number of tubes in the next pass or the next exchanger.

As a result the large number of heating tubes in which the higher viscous liquid tends to flow become much hotter than the small number of tubes in which the vapor tends to flow. This places severe thermal stresses on the small number of vapor tubes and the points where these tubes are fixed to the tube sheets and may result in leakage.

Furthermore, the hotter tubes become fouled or clogged with precipitated polymer which becomes baked onto the tubes so that production must be stopped periodically in order to clean these clogged tubes. This substantially reduces efficiency and yield and substantially increases cost.

Furthermore, as the viscosity of the liquid phase increases, the pressure drop increases severely thereby reducing efficiency and increasing cost.

The intense heat causes degradation of the polymer and discolors it, changes its viscosity and affects its melt index so that the resulting polymer produced may not comply with specifications.

Also, the precipitated polymer becomes baked on to the inner walls of the lower tubes by the intense heat and is extremely difficult to clean except by baking it to a removable dust in an outside oven. This procedure is expensive and seriously interferes with production and efficiency.

It has been suggested to overcome the aforesaid problem caused by separation of the vapor from the liquid phase in the heads to utilize a two pass heat exchanger made up of U-shaped heat exchanger tubes in a single shell with a head at one end of the shell partitioned to form an inlet chamber for the reaction mass and an outlet chamber for the reaction mass. This results in a single shell, two tube pass arrangement with one leg of each U-shaped tube being one pass and the other leg being the second pass. However, this arrangement does not satisfactorily accommodate the large temperature and pressure differences between inlet and outlet and, as a result, the partitioned head is subject to large thermal and mechanical stress with resulting leakage, just as in the case of a single shell multiple tube pass heat exchanger.

BRIEF DESCRIPTION OF THE INVENTION

In accordance with the present invention, both the aforesaid problems caused by the large pressure and temperature differences and the aforesaid problem caused by separation of vapor from the liquid phase in the head are avoided.

This is achieved by the use of generally U-shaped heat exchanger tubes mounted in a generally U-shaped shell through which the heating media flows preferably countercurrent to the flow of the reaction mass in the U-shaped tubes and which has an entry head at one end and exit head at the other end. The U-shaped tubes provide a plurality of continuous, uninterrupted, generally U-shaped passages through which the reaction mass flows. In effect, the heat exchanger becomes a multiple shell multiple tube pass heat exchanger, one leg of the U-shaped heat exchanger being in effect one shell and the other leg being in effect the second shell.

It has been found that tube sizes of between 1 inch and $\frac{1}{4}$ inch, preferably $\frac{3}{4}$ inch, give the best results.

The total length of each of the U-shaped tubes may vary between 20 and 100 feet, preferably between 30 and 60 feet, and the length of the tube legs may vary between 10 and 50 feet, preferably between 15 and 30 feet.

Velocity per tube may vary from less than 0.1 feet/sec to 10 feet/sec preferably between 1 feet/sec and 8 feet/sec, depending on the polyolefin, plant capacity and viscosity of the reaction mass, i.e., the concentration of polymer in the reaction mass.

Smaller tube size, longer total tube lengths, greater pump capacity and fewer total number of U-shaped or sinuous-shaped tubes, result in a greater velocity and hence a greater co-efficient of heat transfer. Thus, varying tube size, or tube length or number of tubes or pump capacity will permit a variation in the others to achieve the desired velocity per tube and co-efficient of heat transfer.

DESCRIPTION OF THE DRAWINGS

The advantages of the invention will be further understood by the following drawings and detailed description thereof in which drawings:

FIG. 3 is an enlarged schematic partial section in elevation of the preheater of FIG. 2.

FIG. 4 is a reduced section taken along the line 4.4 of FIG. 3.

FIG. 5 is a reduced section taken along the line 5.5 of FIG. 3.

DETAILED DESCRIPTION OF THE INVENTION

Figure 1:
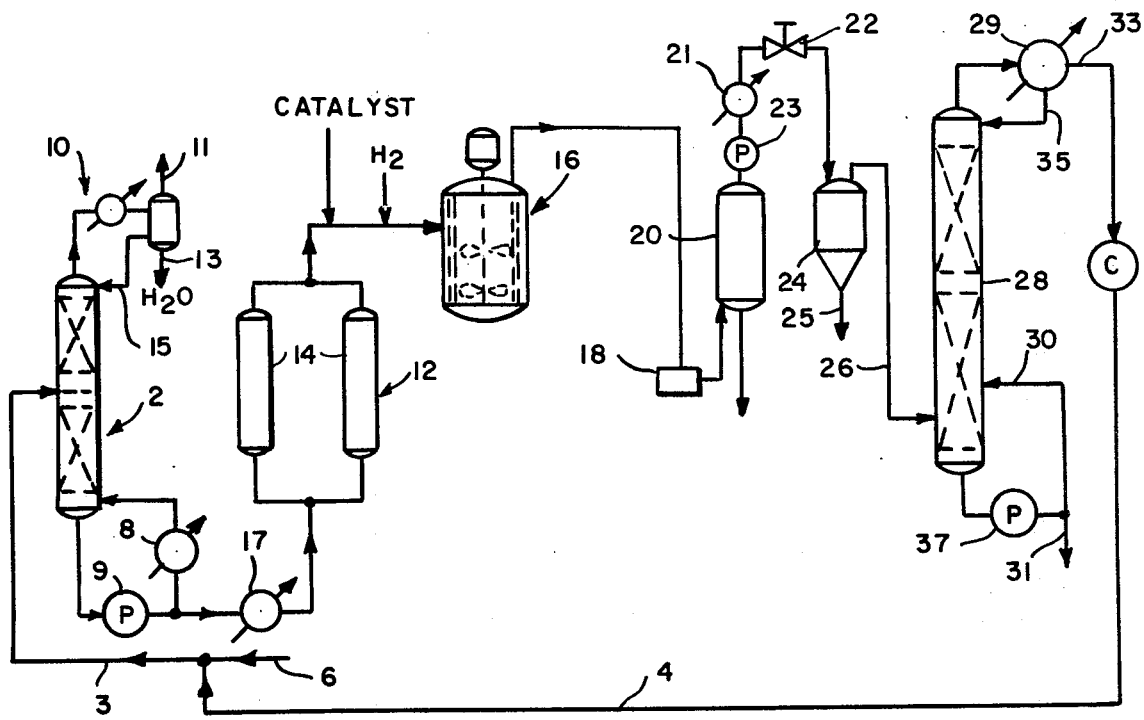
FIG. 1 is a schematic flow sheet of a method embodying the present invention.
Figure 2:
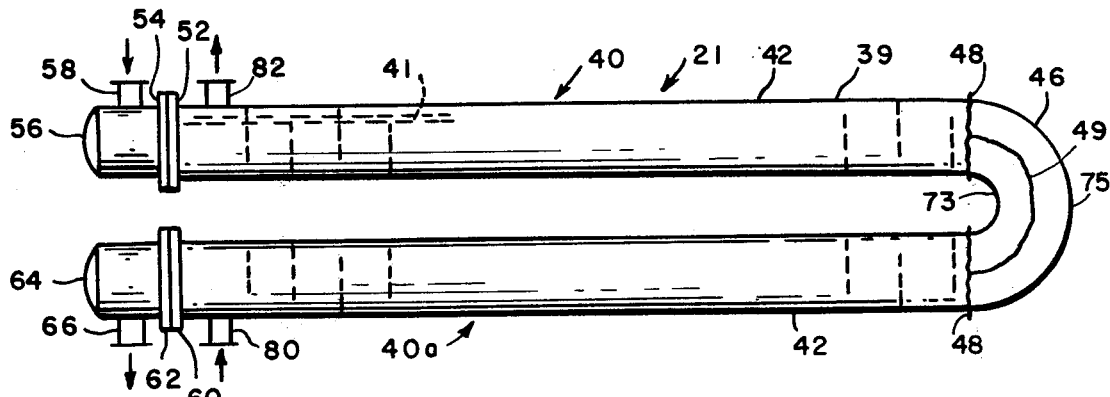
FIG. 2 is a schematic in elevation of the preheater of FIG. 1 showing a preheater employing U-shaped tubes in a U-shaped shell.

With reference to FIGS. 1, 2 represents a stripping column, e.g., a conventional packed tower, for stripping water and light ends from the mixture 3 of liquid monomer recycle 4 and fresh liquid monomer feed 6, both of which are under sufficient positive pressure to maintain them in a liquid state. Light ends are removed as a vapor at 11 from reflux condenser 10. Condensed olefin monomer is refluxed back to the top of tower 2 via 15 and condensed water is removed at 13.

The stripped liquid monomer from tower 2 is pumped by pump 9 through cooler 17 to reduce its temperature to well below reaction temperature (part of the exit from pump 9 is recycled via heater 8 back to the bottom of column 2) and thence to a conventional molecular sieve dryer having two beds 12 and 14, which are cyclically switched by switching valves (not shown) on and off stream. The off-stream bed is regenerated to dry it by heating it and passing a regenerating gas through it while liquid monomer is passing through the on-stream bed.

The dried liquid monomer then flows to the liquid filled reactor 16 where it is mixed with catalyst and hydrogen (to control polymer chain length) while being strongly agitated.

The highly viscous reaction mass, comprising polyolefin dissolved in liquid monomer, passes to mixer 18 where it is mixed with water to kill the reaction.

The reaction mass then passes from mixer 18 to a settling tank 20 in which the heavier water, having catalyst dissolved therein, is separated from the reaction mass as a lower layer. The upper layer of reaction mass still made up of olefin polymer dissolved in liquid monomer is pumped by pump 23 through a preheater 21 (FIGS. 1, 2 and 3) and thence through a flash (reducing) valve 22 over which there is a large pressure drop to flash off the more volatile monomer as a vapor from the polymer into a flash tank 24, from which the polymer is removed at 25 and is extruded, cooled and pelletized and from which the flashed monomer vapor flows via 26 to the lower portion of quenching tower 28, where oligomers are stripped from the monomer vapor by a reflux stream of liquid oligomers. Vapor from the top of the tower 28 flows to a reflux condenser 29, from which the more volatile monomer vapors exit at 33 and from which the condensed liquid oligomers are refluxed via 35 back to the top of the tower to provide the reflux stream.

Part of the condensed liquid oligomer at the bottom of the tower is recycled back to the quench tower via pump 37 and line 30 and part is removed at 31.

The pressure of the monomer vapor 33 is raised by a compressor C to liquify it and the liquid monomer is recycled via line 4.

The preheater 21 (FIGS. 2 to 5) is made up of generally U-shaped heat transfer tubes 38 supported in a generally U-shaped outer shell 39 by means of a pair of tube sheets 51 at the opposite ends of the tubes and a plurality of spaced baffle plates 50 all secured in the straight cylindrical leg portions 42 of the generally U-shaped shell as shown. Each U-shaped tube 38 is made up of a pair of straight parallel leg portions 41 and an integral U-shaped bend 43 connecting such leg portions. Leg portions 41 may be referred to as clusters or banks 40 and 40a of tubes since they correspond to conventional clusters or banks of tubes of conventional multiple tube pass heat exchangers. The exit ends of leg portions 41 of bank 40 are connected with the entry ends of the leg portions 41 of bank 40a by U-bend tubes sections 43 to form continuous uninterrupted U-shaped passages for flow of polymer solution therethrough.

The baffle plates 50 function both to support the tubes 38 and to baffle the flow of heating fluid through the legs 42 of shell 39 and around the outside of the heat transfer tubes 41; they are conventional in configuration each comprising an apertured plate with every other one having a segment 50a cut away at the lower side and the others each having a segment 50b cut away at its upper side for flow of heating medium thereby.

The U-shaped shell 39 is made up of the aforesaid two straight legs 42 and a U-bend section 46 connecting such legs. U-bend section 46 is made up of two pieces 73 and 75 welded together at 49 and to the two shell legs at 48.

The U-tubes 38 are assembled as follows. The inner piece 73 of U-bend section 46 is welded to the ends of legs 42 of the shell at 48. With the outer piece 75 of U-bend section 46 of the shell 39 removed the U-shaped tubes are threaded through the holes in the baffles 50 and tube sheets 51 secured in the shell legs 42, after which the outer half 75 of U-bend section 46 of the shell is welded to the ends of the shell legs 42 at 48 and to the inner half 73 of the U-bend section 46 at 49.

Secured to the other end of the shell leg 42 of bank 40 by means of mating flanges 60 and 62 is a polymer solution exit head 64 with a polymer solution outlet 66.

U-shaped tubes 38 form continuous uninterrupted U-shaped passages from the entry ends 65 of tubes 41 of bank 40 to the exit ends 67 of the tubes 41 of bank 40a.

The shell 42 of bank 40a has an inlet 80 for inletting heating medium into the shell and the shell 42 of bank 40 has an outlet 82 for outletting the heating medium.

The tube sheets 51 seal the heads 56 and 64 and the ends of the U-shaped tubes from the interior of the U-shaped shell around the tubes, i.e., they seal the heating medium from the polymer solution.

The two parts 73 and 75 of the U-shaped shell bend 46 may be removably attached to the shell legs 42 and to each other by flanges and bolts. Also segment 46 may be in the form of a removable one piece dome or cap capping the adjacent ends of the two shell legs 42. In such case, such ends of the shell legs may be secured in a liquid-proof manner by a mating flange and bolts.

Also, the U-bends 43 may be removably secured to the adjacent ends of tube legs 41 of banks 40 and 40a in an airtight and liquid-proof manner.

Although the tube portions 41 and shell legs 42 of the two banks 40 and 40a are shown in FIGS. 2 and 3 as being parallel and the U-shaped tube and shell segments 43 and 46 are shown as 180° U-bends, the bends can be somewhat less than 180° and the straight tube portions 41 and straight shell portions 42 can accordingly extend at a slight angle to each other. The term U-bend and generally U-shaped as used herein encompasses these designs.

The heating medium flows into the shell at 80 and thence along the outside of the tube portions 41 around baffles 50 along the length of bank 40a and thence the shell segment 46 around the tube bends 43 and thence along the length of bank 40 and outlets at 82.

The heating medium may be any conventional heating medium of high boiling point well above flash temperature of the monomer at the particular pressure used. With polypropylene, the polymer solution is preheated in preheater 21 from 180° F. and 700-800 psig through the critical temperature and pressure of 205° F. and 615 psig for propylene to 380° F. at 450 psig, and any conventional heating medium having a boiling point of 470°-500° F. or higher may be used. Among the heating media which can be used is one sold under the trade name Mobiltherm by Mobil Oil Corp. and one sold under the trade name Dowtherm by The Dow Chemical Co.

EXAMPLE

This example is given for a polypropylene plant having a capacity of 15,000,000 pounds of polypropylene per year.

The temperature, pressure, composition, construction and other properties of the various streams and equipment shown in FIG. 1 are set forth below, with reference to the number representing the stream or element of the equipment appearing in FIG. 1.

Stream 6—Fresh liquid propylene feed at a rate of 1880 lbs./hr. and at 70° F. and 175 psig Stream 4—Recycle liquid propylene recycled as described above at a ratio of recycle to fresh feed of 5 to 10 (7 is preferred) recycle to 1 fresh feed at a temperature of 115° F. and a pressure of 235 psig and containing less than 50 ppm of polymer.

Stripper 2—Packed tower
  Liquid propylene monomer—stripping carried out at 170° F. and 400 psig. Reduce water content of monomer to 10-20 ppm.

Cooler 17—Entry to cooler 170° F. and 400 psig. Exit from cooler 100° F. and 400 psig.

Mol. Sieve Dryer 12—Entry and exit 100° F. and 400 psig—regeneration of off-stream dryer at 300° F. and atmospheric pressure.

Catalyst—Conventional Ziegler catalyst 0.5 to 1 lb. catalyst per 100 pounds of fresh monomer feed.

Hydrogen—0.5 to 0.15 lbs. per 100 pounds of fresh monomer feed to control polymer chain length.

Reactor 16—Reactor Temperature 145° F. Pressure 450 psig. Completely liquid filled. Vigorous mixing to ensure good mixing of catalyst and $H_2$ with liquid monomer. Reaction mass outlet—polypropylene dissolved in liquid propylene monomer at 145° F. and 450 psig. Ratio of polymer to liquid monomer—20. Reaction mass—highly viscous.

Mixer 18—Reaction mass inlet—same as reaction mass outlet of reactor 16. Motionless Mixer (high shear intensive mixer) sold under that name by Kenics Incorporated. Exit is 180° F.—$\Delta T$ by heat of mixing—and 450 psig.

Settler 20—Inlet and outlet 180° F. and 450 psig. Residence time ½-2 hours—polymer in monomer oil phase goes to top—aqueous phase containing catalyst goes to bottom and is removed, neutralized and discarded.

Heat Exchanger 21—Inlet 180° F. and 700-800 psig achieved by pump 23. Outlet 380° F. and 450 psig. Heating fluid—high boiling Dowtherm sold by the Dow Chemical Co. Bp 470°-500° F.
  FIG. 2 arrangement
  Tube ID—¾ inch
  Length of tube legs—15 feet
  Total length of U-shaped tubes—32 feet average
  Number of U-shaped tubes—500
  Diameter of shell—2 feet Flash Valve 22—Mason Neilan reducing valve—inlet 380° F. and 450 psig—outlet 85 psig and 300° F. Flashed monomer vapor contains less volatile oligomers and entrained polymer.

Quenching Tower 28—Packed Tower
  Inlet monomer vapor at 300° F. and 85 psig Liquid Oligomer at 31 is 30°-60° F. and 85 psig. Outlet monomer vapor at 33 is 50° F. and 85 psig.

The above description and accompanying drawings of a preferred embodiment of the invention are for purposes of illustration only and it is not intended that the invention be limited thereto or thereby but only to the methods claimed in the appended claims and their equivalents.

I claim:

1. In a method of catalytically polymerizing olefins from liquid olefin monomer under positive pressure, in which the reaction mass comprises polyolefin dissolved in liquid olefin monomer and in which the reaction mass is flowed through the tubes of a tubular heat exchanger to heat it through the critical temperature and pressure of said monomer to a temperature at which the liquid monomer can be removed from the reaction mass as a vapor, the improvement comprising said tubes being a plurality of generally U-shaped tubes mounted in a U-shaped shell in which heating medium is flowed, said U-shaped tubes providing a plurality of continuous, generally U-shaped passages through which said reaction mass flows.

2. A method according to claim 1, the inner diameter of said tubes being between ¼ inch and 1 inch.

3. A method according to claim 2 said diameter being ¾ inch.